US011907757B2

(12) United States Patent
Romea et al.

(10) Patent No.: US 11,907,757 B2
(45) Date of Patent: Feb. 20, 2024

(54) METHOD FOR CONTROLLING A MULTICORE-PROCESSOR ENGINE CONTROL UNIT

(71) Applicant: VITESCO TECHNOLOGIES GMBH, Hanover (DE)

(72) Inventors: Nicolas Romea, Toulouse (FR); Denis Claraz, Toulouse (FR); Olivier Spuig, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 394 days.

(21) Appl. No.: 17/312,490

(22) PCT Filed: Dec. 12, 2019

(86) PCT No.: PCT/EP2019/084930
§ 371 (c)(1),
(2) Date: Jun. 10, 2021

(87) PCT Pub. No.: WO2020/120690
PCT Pub. Date: Jun. 18, 2020

(65) Prior Publication Data
US 2022/0129309 A1    Apr. 28, 2022

(30) Foreign Application Priority Data
Dec. 12, 2018  (FR) ...................... 1872750

(51) Int. Cl.
*G06F 9/48*    (2006.01)
*G06F 9/38*    (2018.01)
*G06F 9/50*    (2006.01)

(52) U.S. Cl.
CPC .......... *G06F 9/4881* (2013.01); *G06F 9/3836* (2013.01); *G06F 9/3877* (2013.01); *G06F 9/5066* (2013.01); *G06F 9/5088* (2013.01)

(58) Field of Classification Search
CPC ....................................................... G06F 9/455
(Continued)

(56) References Cited

U.S. PATENT DOCUMENTS 3,678,495 A * 7/1972 Gilbert ...................... F41J 5/06
367/906
9,043,078 B2   5/2015 Johnson et al.
(Continued)

FOREIGN PATENT DOCUMENTS

CN   103080719 A   5/2013
CN   103377035 A   10/2013
(Continued)

OTHER PUBLICATIONS

Fengguang Song, Enabling and Scaling Matrix Computations on Heterogeneous Multi-Core and Multi-GPU Systems. (Year: 2012).*
(Continued)

*Primary Examiner* — Lechi Truong
(74) *Attorney, Agent, or Firm* — NIXON & VANDERHYE

(57) ABSTRACT

Disclosed is a method for controlling an engine control unit which includes at least two microprocessor cores, including steps of executing a parent subtask and at least one child subtask. The method includes the following steps: —determining the number of executables which remain to be executed in the last child subtask of the first period when the parent subtask of the second period starts; and—determining the number of executables already executed in the parent subtask of the second period when the last child subtask of the first period finishes.

20 Claims, 2 Drawing Sheets

(58) Field of Classification Search
    USPC .......................................................... 718/1
    See application file for complete search history.

(56) References Cited

U.S. PATENT DOCUMENTS

| | | | |
|---|---|---|---|
| 2010/0162253 A1* | 6/2010 | Jeong | G06F 9/4881 |
| | | | 718/102 |
| 2011/0321051 A1 | 12/2011 | Rastogi | |
| 2018/0288273 A1* | 10/2018 | Sakayama | H04N 1/32776 |
| 2019/0188045 A1* | 6/2019 | Vogt | G05B 19/0421 |
| 2021/0109803 A1* | 4/2021 | Lin | G06F 11/0715 |

FOREIGN PATENT DOCUMENTS

| | | |
|---|---|---|
| CN | 108595179 A | 9/2018 |
| FR | 3060150 | 6/2018 |
| WO | 2017081391 A1 | 5/2017 |

OTHER PUBLICATIONS

International Search Report for PCT/EP2019/084930 dated Feb. 5, 2020, 4 pages.
Written Opinion of the ISA for PCT/EP2019/084930 dated Feb. 5, 2020, 6 pages.
Office Action and Search Report, issued in Chinese Patent Application No. 201980082396.X dated Oct. 13, 2023.
Shen et al., "A Virtual Core Resource Distribution Algorithm for Many-Core Processor System-on-Chip", Journal of South China University of Technology (Natural Science Edition), Jan. 2018, vol. 46, No. 1, pp. 1-11.

* cited by examiner

METHOD FOR CONTROLLING A MULTICORE-PROCESSOR ENGINE CONTROL UNIT

This application is the U.S. national phase of International Application No. PCT/EP2019/084930 filed Dec. 12, 2019 which designated the U.S. and claims priority to FR Patent Application No. 1872750 filed Dec. 12, 2018, the entire contents of each of which are hereby incorporated by reference.

BACKGROUND OF THE INVENTION

Field of the Invention

The invention is connected with the automotive field and relates to the control of engine control units which drive the operation of the internal combustion engine of a motor vehicle.

Description of the Related Art

Most current motor vehicles have an engine control unit which is generally located under the engine hood. This engine control unit is connected to sensors making it possible to acquire information on the state of the engine (temperatures, pressures, vibrations, position of the various components, etc.). Taking into account the data collected by these sensors, the engine control unit drives the internal combustion engine by controlling actuators such as fuel injectors, any spark plugs, valves arranged in the various fluid circuits associated with the engine, etc. The engine control unit comprises, to fulfil its function, electronic information-processing means, such as microprocessors.

Recent motor vehicles have an increasing number of sensors on board and their engine control units are programmed to drive the sensors with increasing complexity and finesse. Engine control units are therefore generally growing in size from the point of view of their computing capacity, that is to say of the capacity of their microprocessor. In this context, recent research has led to the use, within engine control units, of multicore microprocessors, that is to say microprocessors having a plurality of physical cores which operate simultaneously. A plurality of programs may therefore be executed in parallel and independently of one another.

However, given that the function of an engine control unit is to drive a complex physical system such as an internal combustion engine, its failure rate must be close to zero insofar as its failure would lead to malfunctions, which could be as serious as engine failure, and pose safety problems with respect to the passengers of the vehicle. The reliability of the digital operations within an engine control unit is therefore critical. Exploitation of the possibilities offered by multicore microprocessors (the execution of a plurality of programs in parallel) can only take place with a guarantee that these offered possibilities do not result in a loss of reliability. However, certain operations are particularly critical because they must take place at high frequencies. This is the case, for example, with cyclic operations indexed to the rotation of the engine, at high engine speeds.

In the prior art, to make these operations safe, methods for controlling an engine control unit having a multicore microprocessor generally use semaphore principles, i.e. when an executable of a task reads or modifies a variable, it locks that variable so that no other executable can concurrently read or modify the variable. These methods are satisfactory from the point of view of safety, but lead to a substantial latency time since the executables are then executed sequentially and these methods therefore do not make the most of the parallel-processing capabilities of multicore processors.

SUMMARY OF THE INVENTION

The invention provides a method of controlling an engine control unit which makes operations safe when using at least two microprocessor cores.

To this end, the invention relates to a method for controlling an engine control unit which is connected to sensors and actuators associated with the internal combustion engine of a vehicle, the engine control unit comprising at least two microprocessor cores, the control method comprising steps of executing a cyclic task, the execution of this task being triggered by a recurrent event which repeats with a period linked to the rotation of the engine, this cyclic task being composed of executables divided into a parent subtask, triggered by the recurrent event and executed by one microprocessor core, and at least one child subtask executed after the parent subtask by another microprocessor core.

The method comprises the following steps:
determining the number of executables which remain to be executed in the last child subtask of the first period when the parent subtask of the second period starts;
determining the number of executables already executed in the parent subtask of the second period when the last child subtask of the first period finishes.

This method according to the invention is particularly advantageous for cyclic tasks indexed to the engine rotation, that is to say when the execution of such a cyclic task is triggered by an event which repeats with a period linked to the rotation of the engine. This same cyclic task therefore repeats with a period which decreases when the speed of the engine increases. At high speed, a new cycle of this cyclic task therefore starts again very quickly after the start of the preceding task.

The method divides each task to be performed in a cycle into various subtasks distributed between the various cores of the microprocessor. Dividing a task into subtasks makes it possible to divide the computational load between the available microprocessor cores. This division is advantageous because it makes it possible to take advantage of all the available computing means, and allows faster and more powerful processing, as well as making it possible to balance the computing loads between the various microprocessor cores.

The method makes it possible to make the concatenation of cyclic tasks safe. When the last child subtask of a cycle finishes and the parent subtask of the next cycle starts, the method determines how many executables of the child subtask remain to be executed as well as the number of executables already executed in the parent subtask. The period of overlap between the last child subtask and the parent subtask of the next cycle is thus identified.

The method according to the invention may allow a diagnosis of the engine control unit. Thus, at regular intervals or intermittently, the overlap of subtasks at the moment when the cyclic tasks are concatenated may be studied to identify executables which would come into conflict with one another during the overlap phases which have been identified. Specifically, when a child subtask and the parent subtask of the next cycle overlap, executables may come into conflict if they are executed simultaneously. The executables which may come into conflict are, for example, executables which modify one and the same variable.

The method according to the invention also allows a safer division of the executables within one and the same task. Specifically, the executables which are executed during the overlap of the tasks are identified. Dynamically (during operation) or statically (during the maintenance phases), executables known to be concurrent may be moved within a task to be executed outside of this overlap range.

The method according to the invention therefore allows better knowledge of the potential malfunctions of an engine control unit and makes it possible to avoid these malfunctions, in particular those which are linked to the execution of concurrent executables during the overlap period.

The engine control unit, and therefore the engine itself, thus benefits from more precise and more reliable control. For example, if a parent task comprises executables making it possible to calculate in which cylinder the next fuel injection must be performed, the engine control unit prevents the executables of a child task which are executed during the overlap with a parent task of the next cycle from using an incorrect cylinder number (which would be calculated by the new parent task) with respect to the current cycle. Consequently, the quantity of gasoline injected is optimal and the emission of polluting products or consumption is better controlled.

The method for controlling an engine control unit may have the following additional features, alone or in combination:
- after the step of determining the number of executables which remain to be executed in the last child subtask of the first period, the method comprises the step of storing this number of executables in a memory;
- after the step of determining the number of executables already executed in the parent subtask of the second period, the method comprises the step of storing this number of executables in a memory;
- the number of executables stored in a memory is furthermore saved in a diagnostic memory;
- the method comprises a diagnostic step consisting in reading the diagnostic memory;
- the step of determining the number of executables which remain to be executed in the last child subtask of the first period comprises the implementation of a counter of executables of the child subtask;
- the initial value of the counter of executables of the child subtask corresponds to the total number of executables in the child subtask, this counter being decremented upon the execution of each executable of the child subtask;
- the step of determining the number of executables already executed in the parent subtask of the second period comprises the implementation of a counter of executables of the parent subtask;
- the initial value of the counter of executables of the parent subtask is zero, this counter being incremented upon the execution of each executable.

BRIEF DESCRIPTION OF THE DRAWINGS

One preferred exemplary embodiment of the invention will now be described with reference to the appended drawings, in which.

DESCRIPTION OF THE PREFERRED EMBODIMENTS

Figure 1:
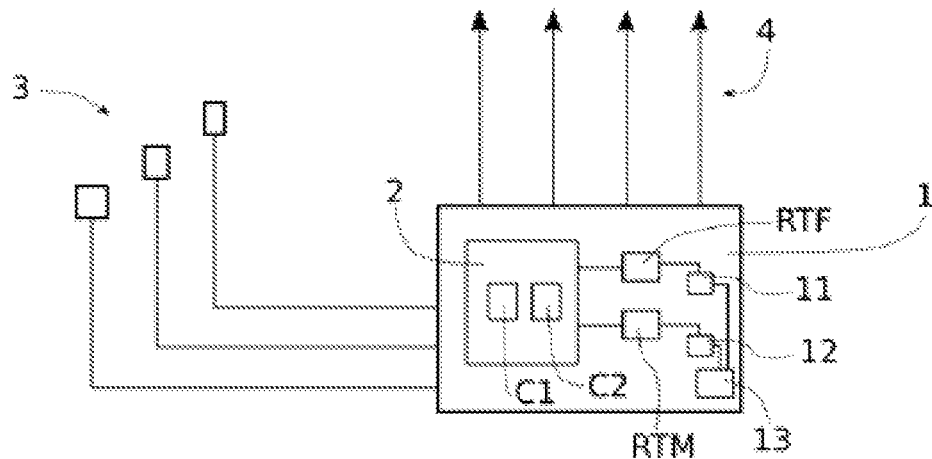
FIG. 1 shows an engine control unit able to implement the control method according to the invention.

FIG. 1 schematically shows an engine control unit 1 intended for driving an internal combustion engine of a motor vehicle.

The engine control unit 1 is connected to a series of sensors 3 such as position, temperature, pressure, flow sensors, etc. The engine control unit 1 is in addition connected to control outputs 4 able to control the actuators involved in driving the engine. These actuators are, for example, spark plugs, fuel injectors, valves, etc.

The engine control unit 1 is programmed in a known manner to, on the one hand, acquire the measurement values delivered by the sensors 3, and on the other hand to control the actuators to ensure the operation of the engine.

The engine control unit 1 comprises a microprocessor 2 which is, in the present example, equipped with two cores C1, C2. In addition to conventional elements allowing the operation of the microprocessor 2, such as a RAM, various buses, etc. (not shown), the unit 1 comprises a first counter RTF of executables and a second counter RTM of executables, which are intended for the implementation of the method described below. These counters RTF and RTM of executables are each associated with a memory 11, 12 of executables. A diagnostic memory 13 makes it possible to back up the memories 11, 12 of executables.

Figure 2:
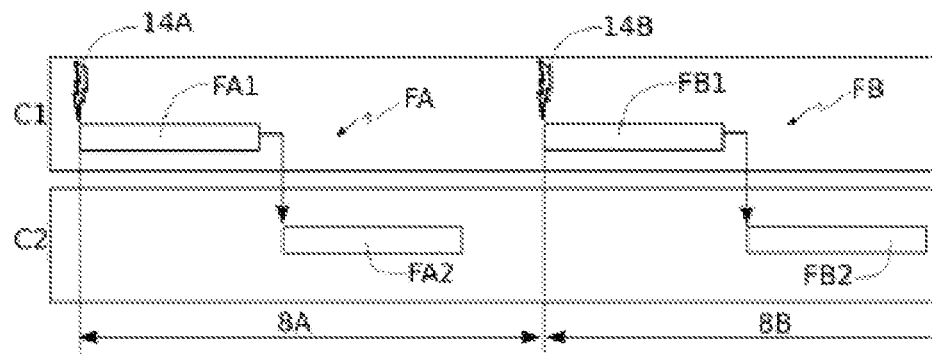
FIG. 2 is a diagram illustrating the concatenation of two cyclic tasks without an overlap period.

FIG. 2 illustrates a cyclic task being run within the microprocessor 2.

The microprocessor 2 is a conventional multicore microprocessor. The engine control unit 1 comprises an operating system suitable for implementing the computer programs designed for the engine control unit 1. The microprocessor 2 is thus made to execute tasks (a task is also called "execution thread") corresponding to the various functions fulfilled by the engine control unit 1. One of these tasks may for example be the control of a fuel injection sequence, of an ignition sequence of a spark plug, or of the opening of a valve. Some of these tasks are cyclic and are indexed to the rotation of the engine; this is the case for example for the injection and ignition tasks. In these cases, the execution of the task is triggered by an event which is identified by one of the sensors 3, this event being linked to the rotation of the engine. For example, the fact that one of the pistons of the engine reaches its top dead center, or another predefined position, is an event which triggers a sequence of injecting fuel into the corresponding cylinder. These cyclic tasks are therefore triggered by an event which repeats with a period linked to the speed of the engine. The increase in the rotational speed of the engine therefore leads to a reduction in the period which elapses between two events.

In FIG. 2, a trigger event 14A is shown at the start of the diagram. This event 14A triggers a task FA. Continuing with the example given above, the event 14A is the presence of a piston of the engine at top dead center, or in a position close to this top dead center, and the task FA is a task of injecting fuel into the corresponding cylinder. This event is cyclic since it repeats in each rotation cycle of the engine, when the piston returns to this same place.

In FIG. 2, the event 14B corresponds to the same event occurring during the next engine cycle. The events 14A, 14B therefore follow each other with a period 8A, 8B which depends on the rotational speed of the engine.

In the example of FIG. 2, the engine speed is constant and the duration of the period 8A, 8B is greater than the run time of the tasks FA, FB.

The microprocessor 2 being, in the present example, a dual-core C1, C2 microprocessor, the execution of each task FA, FB is divided between the various cores C1, C2 of the microprocessor 2. In the schematic diagram of FIG. 2, the upper strip bears the reference C1 and corresponds to the operations executed by the first core C1 while the lower strip bearing the reference C2 corresponds to the operations performed by the second core C2 of the microprocessor 2. Each task FA, FB is thus divided into two subtasks called "parent subtask" FA1, FB1 and "child subtask" FA2, FB2. The parent subtask FA1, FB1 is executed on the first core C1 while the child subtask FA2, FB2 is executed by the second core C2.

For each task FA, FB, the parent subtask FA1, FB1 and the child subtask FA2, FB2 are concatenated in a chained manner, that is to say that the child subtask FA2, FB2 does not start until the parent subtask FA1, FB1 is finished.

Figure 3:
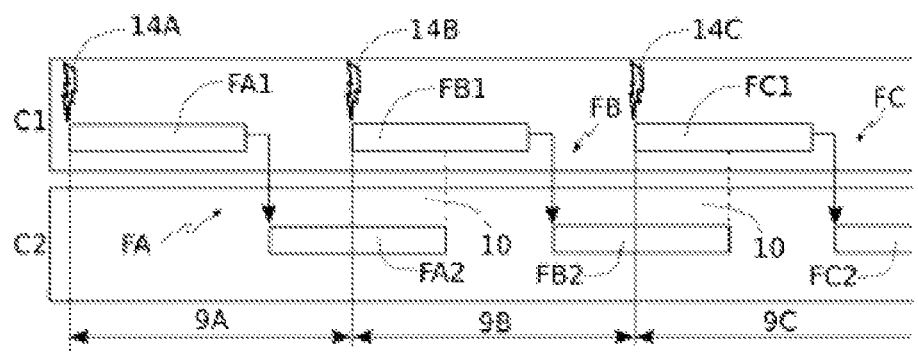
FIG. 3 is similar to FIG. 2 and illustrates the case where the tasks are concatenated with an overlap period.

FIG. 3 shows the same elements as FIG. 2 when the rotational speed of the engine has been increased. The period 9A, 9B, 9C between two events 14A, 14B, 14C is less than the period of FIG. 2.

In this example of FIG. 3, the period 9A, 9B, 9C is now less than the time necessary for the execution of a task FA, FB, FC. Thus, each child subtask FA2, FB2 finishes when the parent subtask FB1, FC1 of the next cycle has already started. A temporal overlap zone 10 (shown hatched in FIG. 3) therefore exists between a task FA, FB, FC of a period 9A, 9B, 9C and the task of the next period.

Figure 4:
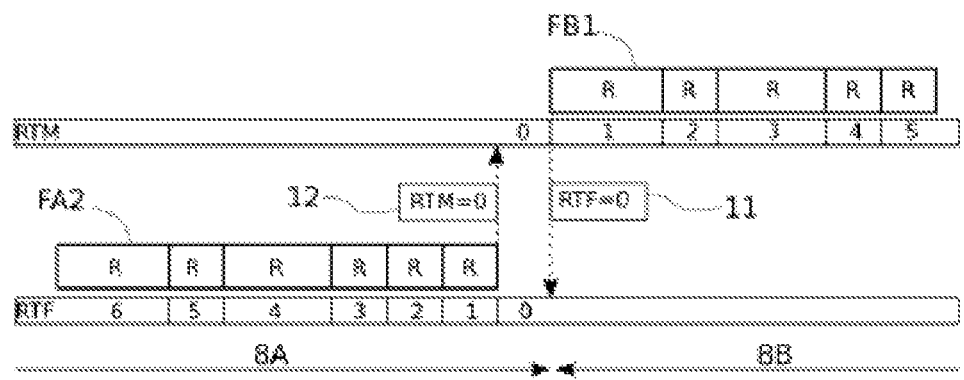
FIG. 4 is a detailed view of FIG. 2.
Figure 5:
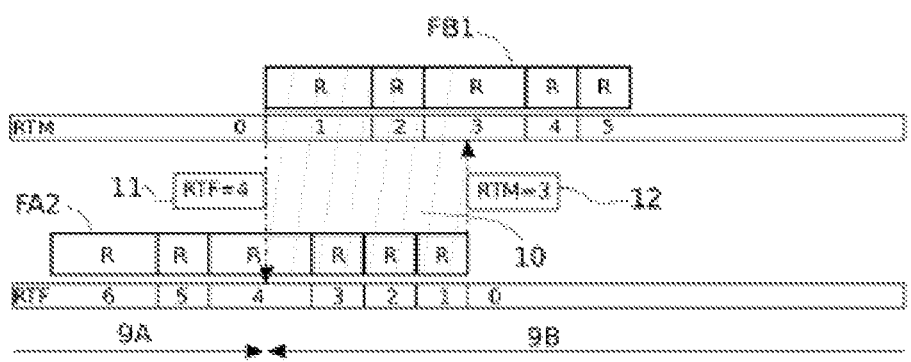
FIG. 5 is a detailed view of FIG. 3.

FIGS. 4 and 5 illustrate in more detail the method allowing the management of this overlap zone 10.

FIGS. 4 and 5 are similar and each illustrate the child subtask FA2 of a first period and the parent subtask FB1 of the next period. FIG. 4 corresponds to the configuration of FIG. 2 in which the period 8A, 8B has a sufficient duration for the child subtask FA2 and the parent subtask FB1 of the next cycle not to overlap. FIG. 5 corresponds to the configuration of FIG. 3 in which the reduced period 9A, 9B leads to the overlap of the child subtask FA2 and of the parent subtask FB1 of the next cycle.

In FIGS. 4 and 5, the detail of the tasks has been shown. The tasks specifically consist of executables R, which are shown schematically in these figures. A task such as a fuel injection operation generally comprises around fifty executables R which are each a function (a simple mathematical operation) or a group of functions which can be executed by the microprocessor 2. Updating a variable indicating the number of the cylinder of the engine where the next fuel injection will take place is an example of an executable R.

The method for controlling the engine control unit 1 implements a first counter RTF of executables for the executables of the child subtask FA2, as well as a second counter RTM of executables for the executables of the parent subtask FB1.

In FIGS. 4 and 5, the counters RTF and RTM of executables have been shown under the subtasks FA2, FB1 with the values successively taken by said counters.

When the child subtask FA2 starts, the counter RTF takes an initial value equal to the total number of executables R of the child subtask FA2. Upon the execution of the first executable R of the child subtask FA2, the counter RTF is therefore equal to 6 (in the illustrated example). The counter RTF is a counter which, starting from the first executable, is decremental: the execution of each new executable R leads the counter RTF to be decremented. Upon the execution of the second executable R, the counter RTF is then decremented to the value 5 and so on. During the execution of the last executable R, the counter RTF is equal to 1 and, at the end of the execution of this last executable R, the counter RTF then takes the value 0.

As regards the second counter RTM of executables, it is an incremental counter and is associated with counting the executables R of the parent subtask FB1. Before the start of the parent subtask FB1, the counter RTM takes the initial value of zero. Upon the execution of the first executable R of the parent subtask FB1, the counter RTM takes the value of 1. The counter RTM starts with the value 0 and is incremented by one unit for each new executable R executed during the parent subtask FB1. By starting the execution of the last executable R, the counter RTM takes the value of 5 (in the illustrated example, the parent subtask FB1 comprises 5 executables R).

At the end of the task FA, that is to say of the child subtask FA2, the engine control unit 1 will read the value of the counter RTM. Likewise, at the moment when the task FB of the next cycle starts, that is to say when the parent subtask FB1 starts, the engine control unit 1 will read the value of the counter RTF.

In the example of FIG. 4, in which the child subtask FA2 and the parent subtask FB1 do not overlap, the counter RTM is equal to 0 at the moment when it is read (at the end of the child subtask FA2), and the counter RTF is equal to 0 at the moment when it is read (at the start of the parent subtask FB1).

With reference to FIG. 5, the child subtask FA2 and the parent subtask FB1 of the next cycle overlap. In this case, when the parent subtask FB1 starts the counter RTF is equal to 4. When the execution of the child subtask FA2 is finished, the value of the counter RTM is equal to 3.

The value of the counter RTF indicates, in this example, that 4 executables R still remain to be executed for the child subtask FA2 when the parent subtask FB1 starts. The value of the counter RTM indicates for its part that, when the child subtask FA2 is finished, the parent subtask FB1 of the next cycle has already executed 3 executables R (more precisely: the first two executables R have been executed completely and the third executable is in the process of being executed).

The counter memories 11, 12 relating to the counters RTF and RTM of executables make it possible to store the last value read by the engine control unit 1. At the end of the child subtask FA2, the value of the counter RTM is read and stored in the memory 12 and, at the start of the parent subtask FB1, the value of the counter RTF is read and stored in the memory 11. The diagnostic memory 13 saves all the values of the counters RTM and RTF, stored by the memories 11, 12 when they are greater than zero.

During a diagnosis of the engine control unit 1, the diagnostic memory 13 will possibly be consulted to find out which concatenations of tasks in the past exhibited an overlap 10 and which executables were executed during this overlap. This diagnosis may be made intermittently or periodically. In the case where this diagnosis is made periodically, the organization of the tasks may be modified so that executables R considered to be critical, when they form part of an overlap zone 10, may be moved to the start of the child subtask FA2 or to the end of the parent subtask FB1 so as to no longer be present in the overlap zones 10. The tasks may also be reorganized dynamically from one cycle to the next.

Variants of the above-described example may be implemented without departing from the scope of the invention.

For example, the described example refers to an engine control unit equipped with a microprocessor 2 comprising two cores C1, C2; however, the invention also applies to all digital processing means making it possible to execute subtasks in parallel, and for example to an engine control unit with a plurality of microprocessors and/or processors with any number of cores greater than 2. In the case of a number of digital processing means greater than 2, for example a 4-core microprocessor, the parent subtask FA1 will give rise to as many cascade child tasks as there are microprocessor cores available to process it. For example, if a microprocessor comprises 4 cores, the parent subtask will be executed on a first core and will possibly give rise to a first child subtask executed on the second core, this child subtask itself giving rise, when it finishes, to a second child subtask executed on the third core, a fourth child subtask then being executed on the fourth core. The method according to the invention will then implement the counters RTF and RTM of executables during the concatenation of the last child subtask and of the parent subtask of the next cycle.

The invention claimed is:

1. A method for controlling an engine control unit which is connected to sensors and actuators associated with the internal combustion engine of a vehicle, the engine control unit comprising at least two microprocessor cores the control method comprising steps of executing a cyclic task, the execution of this task being triggered by a recurrent event which repeats with a period linked to the rotation of the engine, wherein the cyclic task is composed of executables divided into a parent subtask, triggered by the recurrent event and executed by one microprocessor core, and at least one child subtask executed after the parent subtask by another microprocessor core, the method comprising the following steps, during a concatenation of the task of a first period and of the task of a second period which follows the first period: determining the number of executables which remain to be executed in the last child subtask of the first period when the parent subtask of the second period starts; determining the number of executables-already executed in the parent subtask of the second period when the last child subtask of the first period finishes.

2. The method as claimed in claim 1, wherein, after the step of determining the number of executables which remain to be executed in the last child subtask of the first period, the method further comprises the step of storing this number of executables in a memory.

3. The method as claimed in claim 2, wherein, after the step of determining the number of executables already executed in the parent subtask of the second period, the method further comprises the step of storing this number of executables in a memory.

4. The method as claimed in claim 3, wherein the number of executables stored in a memory is furthermore saved in a diagnostic memory.

5. The method as claimed in claim 4, further comprising a diagnostic step consisting in reading the diagnostic memory.

6. The method as claimed in claim 5, wherein the step of determining the number of executables which remain to be executed in the last child subtask of the first period comprises the implementation of a counter of executables in the child subtask.

7. The method as claimed in claim 5, wherein the step of determining the number of executables already executed in the parent subtask of the second period comprises the implementation of a counter of executables in the parent subtask.

8. The method as claimed in claim 4, wherein the step of determining the number of executables which remain to be executed in the last child subtask of the first period comprises the implementation of a counter of executables in the child subtask.

9. The method as claimed in claim 4, wherein the step of determining the number of executables already executed in the parent subtask of the second period comprises the implementation of a counter of executables in the parent subtask.

10. The method as claimed in claim 3, wherein the step of determining the number of executables which remain to be executed in the last child subtask of the first period comprises the implementation of a counter of executables in the child subtask.

11. The method as claimed in claim 3, wherein the step of determining the number of executables already executed in the parent subtask of the second period comprises the implementation of a counter of executables in the parent subtask.

12. The method as claimed in claim 2, wherein the step of determining the number of executables which remain to be executed in the last child subtask of the first period comprises the implementation of a counter of executables in the child subtask.

13. The method as claimed in claim 2, wherein the step of determining the number of executables already executed in the parent subtask of the second period comprises the implementation of a counter of executables in the parent subtask.

14. The method as claimed in claim 1, wherein the step of determining the number of executables which remain to be executed in the last child subtask of the first period comprises the implementation of a counter of executables in the child subtask.

15. The method as claimed in claim 14, wherein an initial value of the counter of executables in the child subtask corresponds to the total number of executables in the child subtask, this counter being decremented upon the execution of each executable of the child subtask.

16. The method as claimed in claim 15, wherein the step of determining the number of executables already executed in the parent subtask of the second period comprises the implementation of a counter of executables in the parent subtask.

17. The method as claimed in claim 14, wherein the step of determining the number of executables already executed in the parent subtask of the second period comprises the implementation of a counter of executables in the parent subtask.

18. The method as claimed in claim 1, wherein the step of determining the number of executables already executed in the parent subtask of the second period comprises the implementation of a counter of executables in the parent subtask.

19. The method as claimed in claim 18, wherein an initial value of the counter of executables in the parent subtask is zero, this counter being incremented upon the execution of each executable.

20. The method as claimed in claim 1, wherein, after the step of determining the number of executables already executed in the parent subtask of the second period, the method further comprises the step of storing this number of executables in a memory.

* * * * *